(12) United States Patent
Wamprecht et al.

(10) Patent No.: US 7,183,352 B2
(45) Date of Patent: *Feb. 27, 2007

(54) WATER-DILUTABLE POLYESTERS WITH CYCLIC IMIDE STRUCTURE

(75) Inventors: Christian Wamprecht, Neuss (DE); Hans-Gerd Van Treek, Bedburg-Hau (DE); Raul Pires, Köln (DE); Ulrich Freudenberg, Pulheim (DE); Robert Reyer, Tönisvorst (DE)

(73) Assignee: Bayer MaterialScience AG, Leverkusen (DE)

( * ) Notice: Subject to any disclaimer, the term of this patent is extended or adjusted under 35 U.S.C. 154(b) by 330 days.

This patent is subject to a terminal disclaimer.

(21) Appl. No.: 10/638,582

(22) Filed: Aug. 11, 2003

(65) Prior Publication Data

US 2004/0063852 A1 Apr. 1, 2004

(30) Foreign Application Priority Data

Aug. 14, 2002 (DE) .................. 102 37 194

(51) Int. Cl.
 *C08G 18/81* (2006.01)
 *C08G 73/10* (2006.01)
 *C08J 3/00* (2006.01)
 *C08K 3/20* (2006.01)
 *C08L 75/00* (2006.01)

(52) U.S. Cl. ............... 524/589; 427/372.2; 427/385.5; 428/423.1; 428/473.5; 428/480; 524/590; 524/591; 524/600; 524/602; 524/839; 524/840; 528/45; 528/310; 528/323; 528/350

(58) Field of Classification Search ............ 528/45, 528/310, 323, 350; 524/589, 590, 591, 600, 524/602, 839, 840; 427/372.2, 385.5; 428/423.1, 428/473.5, 480

See application file for complete search history.

(56) References Cited

U.S. PATENT DOCUMENTS

| | | | |
|---|---|---|---|
| 3,238,181 A | 3/1966 | Anderson | 260/65 |
| 3,732,168 A | 5/1973 | Ottmann et al. | 252/63.7 |
| 3,769,366 A | 10/1973 | Fessler et al. | 260/857 PA |
| 4,239,814 A | 12/1980 | Nagel | 427/120 |
| 4,549,006 A | 10/1985 | Zecher et al. | 528/73 |
| 4,614,782 A | 9/1986 | Nishizawa et al. | 525/424 |
| 4,628,079 A | 12/1986 | Zecher et al. | 528/49 |
| 4,861,857 A | 8/1989 | Kricheldorf et al. | 528/170 |
| 5,075,370 A | 12/1991 | Kubitza et al. | 524/591 |
| 5,194,487 A | 3/1993 | Jacobs | 524/591 |
| 5,266,361 A | 11/1993 | Schwarte et al. | 427/407.1 |
| 5,275,847 A | 1/1994 | Schwarte et al. | 427/407.1 |
| 5,344,873 A | 9/1994 | Blum | 524/591 |
| 5,387,642 A | 2/1995 | Blum et al. | 524/591 |
| 5,389,718 A | 2/1995 | Potter et al. | 524/591 |
| 5,393,570 A | 2/1995 | Schwarte et al. | 427/388.4 |
| 5,514,746 A | 5/1996 | Schwarte et al. | 524/556 |
| 6,057,418 A | 5/2000 | Hartung et al. | 528/272 |
| 6,319,981 B1 | 11/2001 | Dhein et al. | 524/591 |

FOREIGN PATENT DOCUMENTS

| | | |
|---|---|---|
| CA | 2101876 | 2/1994 |
| DE | 38 17 614 | 8/1989 |
| DE | 195 45 571 | 6/1997 |
| EP | 654 053 | 5/1999 |

OTHER PUBLICATIONS

Database WPI Section Ch, Week 197424, Derwent Publications Ltd., London, GB; Class A23, AN 1974-44181V XP002260149 & JP 48 078293 A (Takeda Chem Inds Ltd), Oct. 20, 1973 Zusammenfassung.

Li C-H et al: "Studies On The Synthesis and Properties Of Soluble Homo- And Copolyester-Imide Derived From Imide-Diacid" Journal Of Applied Polymer Science, John Wiley and Sons Inc. New York, US, Bd. 55, Nr. 5, Jan. 31, 1995, Seiten 747-752, XP000516953 ISSN: 0021-8995, Seite 749, linke Spalte -Seite 750, linke Spalte.

*Primary Examiner*—Patrick Niland
(74) *Attorney, Agent, or Firm*—Joseph C. Gil

(57) ABSTRACT

The present invention relates to novel polyesterpolyols with cyclic imide structure and to their use in coating compositions.

7 Claims, No Drawings

WATER-DILUTABLE POLYESTERS WITH CYCLIC IMIDE STRUCTURE

The present invention relates to novel water-dilutable polyesterpolyols with cyclic imide structure and to their use in coating compositions.

From the prior art it is known that polyisocyanates containing free isocyanate groups and having certain selected properties, such as, for example, viscosity or hydrophilicity, can be used in combination with different hydroxy-functional binders, examples being polyesters, polyacrylates or polyurethanes, in aqueous medium as crosslinkers under various conditions. Such systems are known, for example, from EP-A 0 358 979, EP-A 0 469 389, EP-A 0 496 205, EP-A 0 537 568, EP-A 0 583 728, EP-A 0 654 053 and DE-A 41 35 571.

Also known from the prior art are aqueous clearcoat materials based on special acrylate dispersions and amino resins, in combination where appropriate with blocked polyisocyanates. Examples thereof are disclosed in EP-A 0 365 775, EP-A 0 363 723, EP-A 0 521 926 and EP-A 0 521 927. The coating materials recited therein are unsuitable, however, for low baking temperatures. In particular, they cannot be processed on parts made of plastic.

DE-A 195 38 061 describes water-dilutable polyesters with narrow compositional relationships, comprising both aromatic and cycloaliphatic building blocks containing acid groups. The polyesters described are used preferably in automotive clearcoat materials for automotive OEM finishing. A disadvantage with these polyesters is the inadequate resistance to hydrolysis.

Polymers with cyclic imide structures, e.g. polyamideimides from diamines and/or diisocyanates, tricarboxylic anhydrides and ε-caprolactam, are frequently used for heat-resistant coatings in wire enamelling, as disclosed in DE-A 38 17 614 or DE-A 33 32 031. Also described are combinations with modified polyesters, for example in DE-A 32 13 257. These polymers, however, are not water-dilutable.

The object of the present invention was to provide novel polyesters suitable for preparing hydrolysis-resistant polyester dispersions or polyester solutions which are aqueous or can be diluted in water. The polyester dispersions ought additionally to be able to be used for preparing high-grade aqueous two-component polyurethane coating materials and ought to meet the requirements imposed on the properties of the coating, for example drying, surface quality such as hardness, gloss, levelling, smoothness, fullness and effect, polishability and resistance to water, chemical agents or atmospheric effects, weathering and mechanical influences. Moreover, the polyesters of the invention ought also to possess an elasticity such that they are suitable for coating substrates made of plastic.

This object has been achieved through the provision of polyesters with cyclic imide structure.

The invention accordingly provides polyesterpolyols which comprise structural units of the general formula (I)

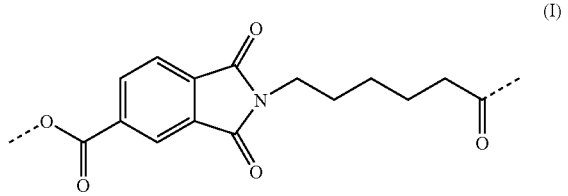

(I)

and/or which comprise structural units of the general formula (II)

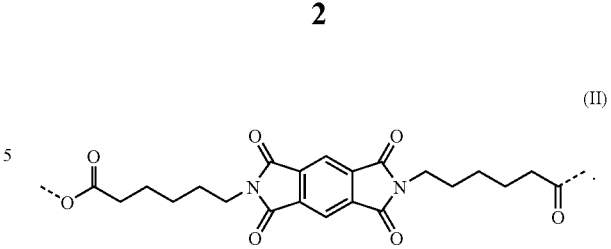

(II)

Likewise provided by the present invention are polyesterpolyols which, as end groups,
comprise structural units of the general formula (III)

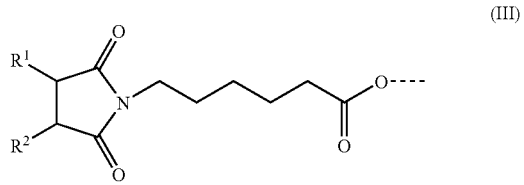

(III)

and/or comprise structural units of the general formula (IV)

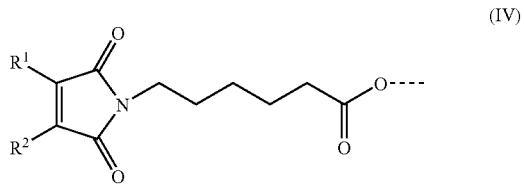

(IV)

in which
$R^1$ and $R^2$, independently of one another, are identical or different and
stand for hydrogen, halogen, unsubstituted or substituted $C_1$–$C_{18}$ alkyl, $C_2$–$C_{18}$ alkenyl, $C_2$–$C_{18}$ alkynyl, $C_3$–$C_{12}$ cycloalkyl, $C_3$–$C_{12}$ hetero-cycloalkyl, $C_6$–$C_{24}$ aryl, $C_1$–$C_{18}$ alkoxy, $C_1$–$C_{18}$ alkylthio, $C_1$–$C_{18}$ alkyl-amino radicals
or
with the joining carbon atom of the $C_4N$ five-membered ring form a $C_3$–$C_{12}$ cycloalkyl or $C_2$–$C_{13}$ heterocycloalkyl radical optionally containing oxygen, nitrogen and/or sulphur
or
both together with the joining carbon atoms of the $C_4N$ five-membered ring form a fused cyclic or polycyclic ring system which is saturated, unsaturated, partly or fully aromatic, is optionally substituted and optionally contains oxygen, nitrogen and/or sulphur.

The polyesterpolyols of the invention of the general formula (I), (II), (III) and (IV) contain free hydroxyl and carboxyl groups.

The polyesterpolyols of the invention have hydroxyl numbers of from 10 to 400 mg KOH/g, preferably from 15 to 350 mg KOH/g and more preferably from 20 to 300 mg KOH/g, acid numbers of from 5 to 100 mg KOH/g, preferably from 10 to 80 mg KOH/g and more preferably from 20 to 60 mg KOH/g.

Suitable synthesis components for the polyesters of the invention are acid components (A), cyclic lactams (B) and alcohol components (C).

Examples of suitable acid components are difunctional carboxylic acids or their derivatives (A1) such as aliphatic, cycloaliphatic or aromatic difunctional carboxylic acids or their anhydrides. Aliphatic difunctional carboxylic acids are, for example, aliphatic saturated dicarboxylic acids such as oxalic acid, malonic acid, dimeth-ylmalonic acid, succinic acid, adipic acid, glutaric acid, azelaic acid, pimelic acid, suberic acid, sebacic acid or the possible anhydrides of these acids and also unsaturated dicarboxylic acids such as fumaric acid, maleic acid, itaconic acid, citric acid or the possible anhydrides of these acids, for example. Preference is given to adipic acid and maleic anhydride. Cycloaliphatic difunctional carboxylic acids are, for example, cyclopentanedicarboxylic acid, 1,3-, 1,4-cyclohexanedicarboxylic acid, 2,5-norbomenedicarboxylic acid, endoethylenecyclohexanedicarboxylic acid and methyltetrahydrophthalic acid, tetrahydrophthalic acid, hexahydrophthalic acid or the possible anhydrides of these acids. Preference is given to 1,4-cyclohexane-dicarboxylic acid, tetrahydrophthalic anhydride and hexahydrophthalic anhydride. Examples of suitable aromatic difunctional carboxylic acids are terephthalic acid, isophthalic acid, phthalic acid, naphthalenedicarboxylic acid, biphenyldicarboxylic acid or the possible anhydrides of these acids, preference being given to phthalic anhydrides, isophthalic acid and terephthalic acid. It is likewise possible to use mixtures of the acids and anhydrides mentioned as component (A1).

Likewise suitable as acid component are carboxylic acids having a functionality of more than 2 (A2), such as trimellitic acid or trimesic acid (functionality=3, (A2')) or pyromellitic acid or benzophenonetetracarboxylic acid (functionality=4, (A2")) or the possible anhydrides of these acids. It is likewise possible to use mixtures of the acids and anhydrides mentioned as component (A2).

Suitable monocarboxylic acids (A3) are selected from the group of the aliphatic, cycloaliphatic or aromatic, saturated or unsaturated, monocarboxylic acid having 1 to 18 carbon atoms, preferably 1 to 12 and more preferably 1 to 8 carbon atoms, such as formic acid, acetic acid, propionic acid, butyric acid, isobutyric acid, valeric acid, 2-methylbutanoic acid, 3-methylbutanoic acid, 2,2-dimethylpropanoic acid, 2-ethylbutanoic acid, 2-ethylhexanoic acid, octanoic acid, decanoic acid, dodecanoic acid, tetradecanoic acid, hexadecanoic acid, octadecanoic acid, saturated and unsaturated fatty acids, cyclohexanecarboxylic acid, cyclohexenoic acid and benzoic acid or the anhydrides of these acids. It is likewise possible to use mixtures of these acids as component (A3). Preference is given to 2-ethylhexanoic acid, saturated and/or unsaturated fatty acids, cyclohexanoic acid and benzoic acid.

Cyclic lactams (B) are compounds of the general formula (V) where

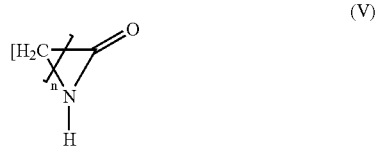

n stands for an integer from 3 to 5.

Examples of suitable compounds of component (B) are γ-butyrolactam and ε-caprolactam, preference being given to ε-caprolactam.

Suitable alcohol components (C) include the following:
(C1) aliphatic or cycloaliphatic $C_3$–$C_{10}$ polyols having a functionality of more than 2,
(C2) aliphatic or cycloaliphatic $C_2$–$C_{18}$ diols,
(C3) aliphatic, cycloaliphatic or araliphatic monofunctional $C_1$–$C_{18}$ alcohols.

Component (C1) comprises aliphatic or cycloaliphatic $C_3$–$C_{10}$ polyols having a functionality of more than 2, such as glycerol, trimethylolethane, trimethylolpropane, pentaerythritol, dipentaerythritol, sorbitol, reaction products of these polyols with ε-caprolactone or alkylene oxides. Preference is given to $C_3$–$C_8$ polyols, such as glycerol, trimethylolpropane and pentaerythritol. It is also possible to use mixtures of the said polyols as component (C1).

Component (C2) comprises aliphatic or cycloaliphatic $C_2$–$C_{18}$ diols, alcohols optionally containing ether oxygen atoms, such as ethylene glycol, diethylene glycol, triethylene glycol, neopentylglycol, propane-1,2-diol and 1,3-diol, dipropylene glycol, butane-1,2-diol, -1,3-diol, -2,3-diol and -1,4-diol, pentane-1,5-diol, 2,2-diethylpropanediol, hexane-1,6-diol and -2,5-diol, 2-methyl-2,4-pentanediol, 2-methyl-1,3-propanediol, 2-butyl-2-ethyl- 1,3-propanediol, 3-methyl- 1,5-pentane-diol, 2-methyl-2-propyl-1,3-propanediol, 2,2-diethyl-1,3-propanediol, cyclohexane-1,4-dimethanol, cyclohexane-1,2-, -1,3- and -1,4-diol, 2,2-bis(4-hydroxycyclo-hexyl)propane and octahydro-4,7-methano-1H-indenedimethanol or reaction products of these diols with ε-caprolactone or alkylene oxides. Preference is given to using $C_2$–$C_{12}$ diols. Mixtures of such diols can likewise be used as component (C2). Preference is given to ethylene glycol, diethylene glycol, propane-1,2-diol, neopentylglycol, hexane-1,6-diol and cyclohexane-1,4-dimethanol.

Suitable compounds for component (C3) are aliphatic, cycloaliphatic or araliphatic monofunctional $C_1$–$C_{18}$ alcohols, such as methanol, ethanol, 1- and 2-propanol, 1- and 2-butanol, isobutanol, tert-butanol, 1-, 2- and 3-pentanol, 2-methyl-1-butanol, 3-methyl-1-butanol, 2,2-dimethylpropanol, 1-, 2- and 3-hexanol, 4-methyl-2-pentanol, 2-ethyl-1-butanol, 2,2-dimethylpropanol, 1-octanol, 2-ethyl-1-hexanol 1-nonanol, trimethyl-1-hexanol, 1-decanol, 1-dodecanol, 1-tetradecanol, 1-hexa-decanol, 1-octadecanol, cyclohexanol, 2-, 3- and 4-methyl-cyclohexanol, hydroxy-methylcyclohexane, 3,3,5-trimethylcyclohexanol, 4-tert-butylcyclohexanol, benzyl alcohol, 1-methyl-4t-isopropylcyclohexanol=(−)-menthol, decahydro-2-naphthol, (1R-endo)- 1,7,7-trimethylbicyclo[2.2.1]heptan-2-ol, (1R-exo)-1,7,7-trimethylbicyclo[2.2.1]heptan-2-ol and (1R)-6,6-dimethylbicyclo[3.1.1]hept-2-ene-2-methanol or reaction products of these monoalcohols with ε-caprolactone or alkylene oxides. Preference is given to $C_1$–$C_{12}$ alcohols, such as 1- and 2-butanol, isobutanol, 2-ethyl-1-hexanol, 1-nonanol, 1-decanol, 1-dodecanol, cyclohexanol, 3,3,5,-trimethyl-cyclohexanol, 4-tert-butylcyclohexanol, benzyl alcohol. Particular preference is given to $C_1$–$C_{10}$ alcohols, such as 2-ethyl-1-hexanol, cyclohexanol, 3,3,5,-tri-methyl-cyclohexanol, 4-tert-butylcyclohexanol and benzyl alcohol. Mixtures of such monoalcohols can likewise be used as component (C3).

The invention likewise provides a process for preparing the polyesterpolyols of the invention comprising structural units of the general formula (I) and/or (II) by
(I) reacting an anhydride of trimellitic acid and/or of pyromellitic acid with a cyclic lactam (B),
(II) synthesizing a hydroxy-functional polyester by adding an alcohol component (C) containing
one or more aliphatic or cycloaliphatic $C_3$–$C_{10}$ polyols having a functionality of more than 2 (C1) and/or
one or more aliphatic or cycloaliphatic $C_2$–$C_{18}$ diols (C2) and optionally one or more aliphatic, cycloaliphatic or araliphatic monofunctional $C_1$–$C_{18}$ alcohols (C3), and also optionally adding an acid component (A) comprising one or more difunctional carboxylic acids or their anhydrides (A1) and/or one or more polyfunctional carboxylic acids or their anhydrides (A2) and optionally one or more monocarboxylic acids (A3).

The invention likewise provides a process for preparing the polyesterpolyols of the invention comprising structural units of the general formula (III) and/or (IV) by (I) reacting an anhydride of a difunctional carboxylic acids (A1) with a cyclic lactam (B), (II) synthesizing a hydroxy-functional polyester by adding an alcohol component (C) containing one or more aliphatic or cycloaliphatic $C_3$–$C_{10}$ polyols having a functionality of more than 2 (C1) and/or one or more aliphatic or cycloaliphatic $C_2$–$C_{18}$ diols (C2) and optionally one or more aliphatic, cycloaliphatic or araliphatic monofunctional $C_1$–$C_{18}$ alcohols (C3), and also optionally by adding an acid component (A) comprising one or more difunctional carboxylic acids or their anhydrides (A1) and/or one or more polyfunctional carboxylic acids or their anhydrides (A2) and optionally one or more monocarboxylic acids (A3).

A general overview of the (preparative) preparation of polyesterpolyols and of the reaction conditions is given for example in "Ullmanns Encyclopädie der Technischen Chemie", Verlag Chemie Weinheim, 4th edition (1980) volume 19, pages 61 ff. or by H. Wagner and H. F. Sarx in "Lackkunstharze", Carl Hanser Verlag, Munich (1971), pages 86 to 152.

The polyesterpolyols of the invention can be processed both to solvent-containing binders or solutions and to aqueous binders or aqueous solutions or dispersions. To prepare aqueous dispersions of the polyesters of the invention the free carboxyl groups are neutralized with a neutralizing agent.

In one preferred embodiment of the process of the invention acid anhydride and lactam, optionally in the presence of alcohols (C) selected from group (C1) to (C3), are reacted with one another in a first stage, giving structural units containing cyclic imide groups. This is followed in a second stage by the esterification with the remaining polyester building blocks, such as acid components (A) and alcohol components (C). The acid components (A1) are preferably used as acid component (A) for synthesizing the polyester. The process of the invention is preferably conducted in the melt, optionally in the presence of a catalytic amount of a usual esterification catalyst, such as acids, bases or transition metal compounds, for example, such as titanium tetrabutoxide, dibutyltin oxide or butylstannic acid, for example, at temperatures from 80 to 270° C., preferably from 100 to 260° C. Optionally it is also possible to add an azeotrope former, such as xylene, to discharge the water of reaction. The esterification reaction is carried out until the target values for the hydroxyl number and acid number and also for the viscosity have been reached. Preferably, in a third stage, the hydroxy-functional polyester is reacted with a carboxylic anhydride selected from the group of the difunctional carboxylic acids (A1) and/or trifunctional carboxylic acids (A2'), with ring opening and half-ester formation.

It is likewise possible in principle to react all of the components in one step to give the polyesters of the invention.

The carboxyl groups formed in the polyesterpolyols of the invention may optionally be neutralized with a neutralizing agent, completely, partially or over-neutralized, so that the polyester becomes water-dilutable. In that case the neutralizing agent can be added before, during or after the ester of the invention is transferred to the aqueous phase.

The invention further provides aqueous solutions or dispersions which comprise the polyesterpolyols of the invention.

To prepare the polyester dispersion either the polyesterpolyol of the invention, where appropriate with strong shearing, such as vigorous stirring, for example, is introduced into the water or, conversely, water is stirred into the polyesterpolyol. The dispersing medium may at the same time contain the neutralizing agent and/or further additives as well.

Suitable neutralizing agents (D) include not only inorganic but also organic bases. Preference is given to using primary, secondary and tertiary amines, such as ammonia, ethylamine, propylamine, dimethylamine, dibutylamine, cyclohexylamine, benzylamine, morpholine, piperidine, diethanolamine and triethanolamine. It is preferred to use tertiary amines, such as triethylamine, N,N-dimethylethanolamine, N,N-diethylethanolamine, triethanolamine, triisopropylamine, N-methylmorpholine, 2-amino-2-methylpropanol. Particular preference is given to N,N-dimethylethanolamine, triethanolamine and triethylamine.

The neutralizing agents (D) are normally used in amounts of from 0.4 to 1.3 mol, preferably from 0.5 to 1.2 mol and more preferably from 0.6 to 1.1 mol, relative to each mole of free carboxyl groups in the polyester.

It is also possible to dissolve the polyesterpolyols of the invention in an organic solvent after the second or third reaction stage and to use the polyester solution for preparing solvent-containing binder.

Organic solutions of the polyesterpolyols of the invention are therefore further provided by the invention.

Examples of suitable solvents are esters, such as ethyl acetate, butyl acetate, methoxypropyl acetate, methylglycol acetate, ethylglycol acetate, diethylene glycol monomethyl ether acetate; ketones, such as methyl ethyl ketone, methyl isobutyl ketone, methyl amyl ketone; aromatics, such as toluene and xylene, and also the relatively high-boiling hydrocarbon mixtures that are common in paint chemistry.

From the polyesterpolyols of the invention and/or their solutions or dispersions it is possible to prepare binders for two-component (2K) polyurethane coating materials. In the case of blocked polyisocyanates and/or amino resins, e.g. melamine resins, it is likewise possible to use the polyesterpolyols of the invention or their solutions or dispersions in one-component (1K) coating materials. Preference is given to their use as 2K polyurethane coating material.

As polyisocyanate component it is possible to use non-blocked or blocked polyisocyanates which are obtainable by modifying simple aliphatic, cycloaliphatic, araliphatic and/or aromatic diisocyanates, polyisocyanates synthesized from at least two diisocyanates and having a uretdione, isocyanurate, allophanate, biuret, iminooxadiazinedione and/or oxadiazinetrione structure, as described exemplarily for example in J. Prakt. Chem. 336 (1994) page 185–200.

Suitable diisocyanates for preparing the polyisocyanates are diisocyanates which are obtainable by phosgenation or by phosgene-free processes, for example by thermal urethane cleavage, and which come from the molecular weight range from 140 to 400 and contain aliphatically, cycloaliphatically, araliphatically and/or aromatically attached isocyanate groups, such as, for example, 1,4-diisocyanatobutane, 1,6-diisocyanatohexane (HDI), 2-methyl-1,5-diisocyanatopentane, 1,5-diisocyanato-2,2-dimethylpentane, 2,2,4- and/or 2,4,4-trimethyl-1,6- diisocyanatohexane, 1,10-diisocyanatodecane, 1,3- and 1,4-diisocyanatocyclohexane, 1,3- and 1,4-bis (isocyanatomethyl)cyclohexane, 1-isocyanato-3,3,5-trimethyl-5-isocyanatomethylcyclohexane (isophorone diisocyanate, IPDI), 4,4'-diisocyanatodicyclohexylmethane, 1-isocyanato-1-methyl-4(3)-isocyanatomethylcyclohexane, bis(isocyanatomethyl)-norbornane, 1,3- and 1,4-bis(2-isocyanatoprop-2-yl)benzene (TMXDI), 2,4- and 2,6-diisocyanatotoluene (TDI), 2,4'- and 4,4'-diisocyanatodiphenylmethane, 1,5-diisocyanatonaphthalene or any desired mixtures of such diisocyanates.

Moreover, triisocyanates such as triphenylmethane 4,4', 4"-triisocyanate and/or 4-isocyanatomethyloctane 1,8-diisocyanate are also suitable.

It is preferred to use polyisocyanates or polyisocyanate mixtures of the type mentioned containing exclusively aliphatically and/or cycloaliphatically attached isocyanate groups.

Particularly preferred polyisocyanates or polyisocyanate mixtures are those with isocyanurate and/or biuret structure based on HDI, IPDI and/or 4,4'-diisocyanatodicyclohexylmethane.

In order to achieve better incorporability of the said polyisocyanates into aqueous binders, the polyisocyanates are preferably hydrophilically modified. Use is made for this purpose, by methods which are known per se, of polyisocyanates of the abovementioned type. The hydrophilicization can take place, for example, anionically, cationically or nonionically, by way of internal or external emulsifiers.

Polyisocyanates hydrophilicized by internal emulsifiers are, for example, those which have been hydrophilicized by carboxyl groups and which, following neutralization of the carboxyl groups, can be stirred with very fine division into aqueous systems without the need for high shearing forces. Such polyisocyanates are, for example, subject-matter of EP-A 443 138 and EP-A 510 438. It is additionally possible to use polyisocyanates hydrophilically modified by polyethers. The preparation of such water-dispersible polyisocyanates containing urethane groups are, for example, subject-matter of EP-A 206 059, EP-A 540 985 and of U.S. Pat. No. 5,200,489. Water-dispersible polyisocyanates which contain allophanate groups and have been hydrophilically modified with polyethers, and their preparation, are subject-matter of EP-A 0 959 087. 2K PU coating materials based on these polyisocyanates are subject-matter of EP-A 959 115 and of EP-A 1 065 228.

Likewise suitable are the water-emulsifiable polyisocyanates described in EP-A 0 703 255, comprising as ionic emulsifiers reaction products of polyisocyanates and any desired hydroxy-, mercapto- or amino-functional compounds having at least one sulphur-acidic group or anion thereof. Preferred sulphur-acidic synthesis components specified there for preparing the emulsifiers are hydroxysulphonic acids containing aliphatically attached OH groups or the salts of such hydroxysulphonic acids, examples being special polyethersulphonates, as traded, for example, under the name Tegomer® (Th. Goldschmidt AG, Essen, Del.), bisulphite adducts with unsaturated alcohols, hydroxyethanesulphonic and hydroxypropanesulphonic acid, and amino-sulphobetaines preparable by quaternizing tertiary amino alcohols with 1,3-propane sultone. Also preferred are 2-(cyclohexylamino)ethanesulphonic acid and 3-(cyclohexylamino)propanesulphonic acid or salts thereof as hydrophilicizing components.

Examples of suitable external emulsifiers are anionic emulsifiers, such as those based on alkyl sulphate, alkylarylsulphonates, alkylphenol polyether sulphates as indicated for example in Houben-Weyl, Methoden der organischen Chemie, additional and supplementary volumes, 4$^{th}$ Edition, Volume E20, 1987 (Part 1, pages 259 to 262) or alkyl polyether sulphates, or nonionic emulsifiers, such as the alkoxylation products, preferably ethoxylation products, of alkanols, phenols or fatty acids.

The polyisocyanates have an NCO content of 1 to 45% by weight, preferably from 8 to 25% by weight. They may optionally be diluted with a solvent which is at least partly miscible with water but is inert towards isocyanate groups.

Preference is given to using polyisocyanates which contain urethane groups and are hydrophilicized by internal emulsifiers, which are subject-matter of EP-A 540 985, for example, and polyisocyanates containing allophanate groups, which are described, for example, in EP-A 0 959 087. Particular preference is given to using polyether-modified polyisocyanates containing allophanate groups, disclosed in EP-A 0 959 087. Preferably 60 to 99 mol % of the polyether are attached to the polyisocyanate by way of allophanate groups.

The present invention also provides a process for preparing solvent-containing or aqueous coating compositions, characterized in that the polyisocyanate component and optionally further binders are incorporated by stirring or emulsification into the binder comprising the polyesterpolyols of the invention.

The quantitative ratio of binder component and curing component in this case is chosen such that for each hydroxyl group of the resin component there are from 0.1 to 3.0, preferably from 0.5 to 2.0 and more preferably from 0.7 to 1.7 isocyanate groups of the curing component.

Prior to the addition of the curing component it is possible to incorporate the customary auxiliaries and additives of coatings technology into the binder component or the curing component, but preferably the binder component. These include, for example, defoamers, thickeners, levelling agents, pigments, fillers, emulsifiers, dispersing assistants, light stabilizers and also solvents.

The desired processing viscosity is set in general by adding solvent or water. In order to set specific processing viscosities or to obtain particular Theological properties it is also possible to use thickeners or combinations of different thickeners, such as ionic and associative thickeners.

Examples of suitable substrates are mineral building material surfaces, road coverings, wood and wood-based materials, metallic surfaces, plastics, glass, textiles, fabric or paper.

The coating materials comprising the polyesterpolyols of the invention are used as one-component (1K) or also as two-component (2K) coating materials.

The coating materials comprising the polyesterpolyols of the invention are used preferably as primers, surfacers, pigmented topcoat materials and clearcoat materials in the field of automotive refinish and large-vehicle finishing, in general industrial coating, in the coating of plastics and also in wood coating. Particular preference is given to use for applications which call for particularly high application safety, rapid drying, a rapid increase in hardness to a high ultimate hardness but with good elasticity, very good optical properties, characterized by very good levelling and high gloss, and also good resistance to solvents, chemicals, water and weathering, such as, for example, in automotive refinish and large-vehicle finishing or in general industrial coating.

The coating compositions comprising the polyesterpolyols of the invention can be applied to the respective substrates by any of a very wide variety of spraying techniques, such as air-pressure spraying, airless spraying or electrostatic spraying techniques, using one-component or two-component spraying units, or else by brushing, rolling, flowcoating or knifecoating.

The coatings are dried and cured in general under normal temperature conditions, i.e. without heating of the coating. However, it is also possible to use the coating compositions of the invention to produce coatings which following application are dried and cured at elevated temperature, e.g. at 40 to 250° C., preferably at 40 to 150° C. and more preferably at 40 to 100° C.

The polyesterpolyols of the invention with cyclic imide groups lead to improved properties in the coatings produced from them. Solvent-containing and aqueous two-component polyurethane coating materials comprising the polyesterpolyols of the invention give coatings featuring very rapid drying, high hardness coupled with good elasticity, high resistance to solvents, chemicals and water, very good levelling, and also very high gloss. Aqueous dispersions based on the polyesterpolyols of the invention feature better storage stability than the polyester dispersions of the prior art, even at elevated temperatures of 40 to 50° C., and a better hydrolysis resistance.

EXAMPLES

In the examples below all percentages are by weight.

The stated "solids content" was determined by the thick-layer method, in which a defined amount of sample is dried in a convection oven at 125° C. for 1 h and the solids content is calculated from the resultant decrease in weight (based on EN ISO 3251).

The acid number (mg KOH/g sample) was determined by titration with 0.1 mol/l NaOH solution on the basis of DIN 53402.

The OH number (mg KOH/g sample) was determined by acetylation, hydrolysis and subsequent titration of the liberated HCl with 0.1 mol/l NaOH on the basis of DIN 53240.

Unless indicated otherwise the viscosities were determined at 23° C. on a VT 550 rotational viscometer from Haake GmbH, Karlsruhe, Del.

The statement "as-supplied form" refers to the as-is solution or dispersion of the polyesterpolyols; by "resin solids" is meant the non-volatile resin fraction of the solution or dispersion present.

Example 1

Preparation of a Water-dilutable Polyesterpolyol I 334 g of neopentylglycol, 638 g of 1,4-cyclohexanedimethanol, 733 g of trimellitic anhydride and 432 g of ε-caprolactam were weighed out together into a reactor equipped with stirrer, heating, automatic temperature control, nitrogen inlet, column, water separator and receiver and, with stirring and passing of nitrogen through the system, were heated to 230° C. in such a way that the overhead temperature of the column did not exceed 103° C. During this procedure the water of reaction was separated off. Condensation was carried out to an acid number of <5 mg KOH/g.

The system was then cooled to 150° C. and 870 g of neopentylglycol, 827 g of trimethylolpropane and 1874 g of phthalic anhydride were added. Subsequently, with stirring and passing of nitrogen through the system, the reaction mixture was heated to 220° C. in such a way that the overhead temperature of the column did not exceed 103° C. During this procedure, water of reaction continued to separate out. After the end of distillation, the water separator was replaced by a distillation bridge and the reaction mixture was stirred at 220° C. until the overhead temperature of the column fell to below 90° C. The column was removed and the reaction mixture was condensed with an increased nitrogen flow to an acid number of <5 mg KOH/g. The system was then cooled to 140° C., 418 g of trimellitic anhydride were added and the mixture was stirred at 170° C. until an acid number of about 35 mg KOH/g was reached.

Up to this point in the preparation of the polyester a total of about 1770 g of polyester resin had been removed as a result of sampling and other removals. The remaining mixture was then cooled to 130° C., and 210 g of dipropylene glycol dimethyl ether were added and dissolved in at 100° C. over one hour. The resulting solution was then stirred at 50° C. into a mixture of 134 g of N,N-dimethyl-ethanolamine and 3174 g of deionized water, which was at 50° C., over the course of one hour. The resulting product was adjusted with further water to a solids content of about 47% by weight. This gave an opaque dispersion with a bluish shimmer which had a solids content of 46.7% by weight in terms of polyesterpolyol (measured as the non-volatile fraction of a dispersion sample which was dried in a forced-air oven at 125° C. for 60 minutes), an acid number of 16.3 mg KOH/g (based on as-supplied form), an OH number of 116 mg KOH/g (based on resin solids) and a viscosity of 2306 mPa·s at 23° C. The dispersion contained about 2.4% by weight of dipropylene glycol dimethyl ether, about 1.7% by weight of N,N-dimethylethanolamine and about 49.2% by weight of water. The product can be diluted further with water and is suitable for use in aqueous two-component polyurethane coating materials.

Example 2

Preparation of a Water-dilutable Polyesterpolyol II

In analogy to example 1 a water-dilutable polyesterpolyol or an aqueous polyester was prepared from the following components: 1204 g of neopentyl glycol, 638 g of 1,4-cyclohexanedimethanol, 1111 g of trimellitic anhydride, 432 g of ε-caprolactam, 827 g of trimethylolpropane, 1874 g of phthalic anhydride, 210 g of dipropylene glycol dimethyl ether and 120 g of N,N-dimethylethanolamine. The resulting product was adjusted with water to a solids content of about 43% by weight. This gave an opaque dispersion with a bluish shimmer which had a solids content of 42.7% by weight in terms of polyesterpolyol (measured as the non-volatile fraction of a dispersion sample which was dried in a forced-air oven at 125° C. for 60 minutes), an acid number of 13.1 mg KOH/g (based on as-supplied form), an OH number of 117 mg KOH/g (based on resin solids) and a viscosity of 410 mpa·s at 23° C. The dispersion contained about 2.3% by weight of dipropylene glycol dimethyl ether, about 1.3% by weight of N,N-dimethylethanolamine and about 53.4% by weight of water. The product can be diluted further with water and is suitable for use in aqueous two-component polyurethane coating materials.

Example 3

Preparation of a Water-dilutable Polyesterpolyol III

In analogy to example 1 a water-dilutable polyesterpolyol or an aqueous polyester was prepared from the following components: 1197 g of neopentylglycol, 590 g of 1,4-cyclohexanedimethanol, 1438 g of trimellitic anhydride, 601 g of ε-caprolactam, 792 g of trimethylolpropane, 1571 g of phthalic anhydride, 210 g of dipropylene glycol dimethyl ether and 134 g of N,N-dimethylethanolamine. The resulting product was adjusted with water to a solids content of about 45% by weight. This gave an opaque dispersion with a bluish shimmer which had a solids content of 44.9% by weight in terms of polyesterpolyol (measured as the non-volatile fraction of a dispersion sample which was dried in a forced-air oven at 125° C. for 60 minutes), an acid number of 15.7 mg KOH/g (based on as-supplied form), an OH number of 109 mg KOH/g (based on resin solids) and a viscosity of 404 mpa·s at 23° C. The dispersion contained about 2.4% by weight of dipropylene glycol dimethyl ether, about 1.6% by weight of N,N-dimethylethanolamine and about 51.0% by weight of water. The product can be diluted further with water and is suitable for use in aqueous two-component polyurethane coating materials.

Example 4

Preparation of a Water-dilutable Polyesterpolyol IV

In analogy to example 1 a water-dilutable polyesterpolyol or an aqueous polyester was prepared from the following components: 1139 g of neopentylglycol, 533 g of 1,4-cyclohexanedimethanol, 1646 g of trimellitic anhydride, 723 g of ε-caprolactam, 760 g of trimethylolpropane, 1292 g of phthalic anhydride, 210 g of dipropylene glycol dimethyl ether and 137 g of N,N-dimethylethanolamine. The resulting product was adjusted with water to a solids content of about 37% by weight. This gave an opaque dispersion with a bluish shimmer which had a solids content of 36.8% by weight in terms of polyesterpolyol (measured as the non-volatile fraction of a dispersion sample which was dried in a forced-air oven at 125° C. for 60 minutes), an acid number of 13.4 mg KOH/g (based on as-supplied form), an OH number of 98 mg KOH/g (based on resin solids) and a viscosity of 842 mPa·s at 23° C. The dispersion contained about 1.9% by weight of dipropylene glycol dimethyl ether, about 1.3% by weight of N,N-dimethylethanolamine and about 59.8% by weight of water. The product can be diluted further with water and is suitable for use in aqueous two-component polyurethane coating materials.

Example 5

Preparation of a Water-dilutable Polyesterpolyol V

In analogy to example 1 a water-dilutable polyesterpolyol or an aqueous polyester was prepared from the following components: 1137 g of neopentylglycol, 533 g of 1,4-cyclohexanedimethanol, 1646 g of trimellitic anhydride, 723 g of ε-caprolactam, 753 g of trimethylolpropane, 1330 g of hexahydrophthalic anhydride, 210 g of dipropylene glycol dimethyl ether and 137 g of N,N-dimethylethanolamine. The resulting product was adjusted with water to a solids content of about 37% by weight. This gave an opaque dispersion with a bluish shimmer which had a solids content of 36.7% by weight in terms of polyesterpolyol (measured as the non-volatile fraction of a dispersion sample which was dried in a forced-air oven at 125° C. for 60 minutes), an acid number of 12.8 mg KOH/g (based on as-supplied form), an OH number of 99 mg KOH/g (based on resin solids) and a viscosity of 5345 mPa·s at 23° C. The dispersion contained about 1.9% by weight of dipropylene glycol dimethyl ether, about 1.3% by weight of N,N-dimethylethanolamine and about 59.8% by weight of water. The product can be diluted further with water and is suitable for use in aqueous two-component polyurethane coating materials.

Example 6

Preparation of a Water-dilutable Polyesterpolyol VI

In analogy to example 1 a water-dilutable polyesterpolyol or an aqueous polyester was prepared from the following components: 920 g of trimellitic anhydride, 337 g of ε-caprolactam, 2056 g of trimethylolpropane, 858 g of hexahydrophthalic anhydride, 463 g of isophthalic acid, 1284 g of 2-ethylhexanoic acid, 210 g of N-methylpyrrolidone and 157 g of N,N-dimethylethanolamine. The resulting product was adjusted with water to a solids content of about 45% by weight. This gave an opaque dispersion with a bluish shimmer which had a solids content of 45.0% by weight in terms of polyesterpolyol (measured as the non-volatile fraction of a dispersion sample which was dried in a forced-air oven at 125° C. for 60 minutes), an acid number of 19.1 mg KOH/g (based on as-supplied form), an OH number of 112 mg KOH/g (based on resin solids) and a viscosity of 2075 mPa·s at 23° C. The dispersion contains about 2.4% by weight of N-methylpyrrolidone, about 1.8% by weight of N,N-dimethylethanolamine and about 50.8% by weight of water. The product can be diluted further with water and is suitable for use in aqueous two-component polyurethane coating materials.

Example 7

Preparation of a Water-dilutable Polyesterpolyol VII

In analogy to example 1 a water-dilutable polyesterpolyol or an aqueous polyester was prepared from the following components: 1349 g of trimellitic anhydride, 590 g of ε-caprolactam, 1896 g of trimethylolpropane, 383 g of hexahydrophthalic anhydride, 413 g of isophthalic acid, 1284 g of 2-ethylhexanoic acid, 210 g of N-methylpyrrolidone and 155 g of N,N-dimethylethanolamine. The resulting product was adjusted with water to a solids content of about 48% by weight. This gave an opaque dispersion with a bluish shimmer which had a solids content of 47.9% by weight in terms of polyesterpolyol (measured as the non-volatile fraction of a dispersion sample which was dried in a forced-air oven at 125° C. for 60 minutes), an acid number of 19.4 mg KOH/g (based on as-supplied form), an OH number of 100 mg KOH/g (based on resin solids) and a viscosity of 2536 mpa·s at 23° C. The dispersion contained about 2.5% by weight of N-methylpyrrolidone, about 2.0% by weight of N,N-dimethylethanolamine and about 47.5% by weight of water. The product can be diluted further with water and is suitable for use in aqueous two-component polyurethane coating materials.

Example 8

Preparation of a Solvent-containing Polyesterpolyol VIII 1857 g of trimethylolpropane, 1573 g of 1,4-cyclohexanedicarboxylic acid, 1174 g of hexahydrophthalic anhydride and 862 g of ε-caprolactam were weighed out together into a reactor as in example 1 and, with stirring and passage of nitrogen through the system, were heated to 220° C. in such a way that the overhead temperature of the column did not exceed 103° C. During this procedure, water of reaction separated out. After the end of distillation, the water separator is replaced by a distillation bridge and the reaction mixture is stirred at 220° C. until the overhead temperature of the column fell to below 90° C. The column was removed and the reaction mixture was condensed with an increased nitrogen flow to an acid number of <3.5 mg KOH/g. The system was then cooled to 120° C. 254 g of hexahydrophthalic anhydride and 1250 g of butyl acetate were added and the mixture was stirred at 120° C. until an acid number of about 22 mg KOH/g was reached. The resulting solution was then cooled to 50° C. and filtered through a filter (Seitz T 5500). This gave a clear, light-colored polyester solution having a solids content of 76.2% by weight, a viscosity at 23° C. of 6950 mPas, an OH number of 99 mg KOH/g and an acid number of 22.2 mg KOH/g.

Example 9, Comparative

Preparation of a Water-dilutable Polyesterpolyol IX

Polyesterpolyol prepared in analogy to example 1, but trimellitic anhydride and ε-caprolactam from the first condensation step had been replaced by isophthalic acid.

In analogy to example 1 a water-dilutable polyesterpolyol or an aqueous polyester was prepared from the following components: 1286 g of neopentyl glycol, 574 g of 1,4-cyclohexanedimethanol, 846 g of trimethylolpropane, 586 g of isophthalic acid, 2089 g of phthalic anhydride, 418 g of trimellitic anhydride, 210 g of dipropylene glycol dimethyl ether and 123 g of N,N-dimethylethanolamine. The resulting product was adjusted with water to a solids content of about 41% by weight. This gave an opaque dispersion with a bluish shimmer which had a solids content of 40.5% by weight in terms of polyesterpolyol (measured as the non-volatile fraction of a dispersion sample which was dried in a forced-air oven at 125° C. for 60 minutes), an acid number of 13.8 mg KOH/g (based on as-supplied form), an OH number of 115 mg KOH/g (based on resin solids) and a viscosity of 442 mPa·s at 23° C. The dispersion contained about 2.2% by weight of dipropylene glycol dimethyl ether, about 1.3% by weight of N,N-dimethylethanolamine and about 55.5% by weight of water. The product can be diluted further with water and is suitable for use in aqueous two-component polyurethane coating materials.

Example 10, Comparative

Preparation of a Water-dilutable Polyesterpolyol X

Polyesterpolyol prepared in analogy to example 7, but trimellitic anhydride and ε-caprolactam had been replaced by isophthalic acid and hexahydrophthalic anhydride in the first condensation step.

In analogy to example 1 a water-dilutable polyesterpolyol or an aqueous polyester was prepared from the following components: 2184 g of trimethylolpropane, 957 g of hexahydrophthalic anhydride, 1032 g of isophthalic acid, 1272 g of 2-ethyl-hexanoic acid, 355 g of trimellitic anhydride, 215 g of N-methylpyrrolidone and 157 g of N,N-dimethylethanolamine. The resulting product was adjusted with water to a solids content of about 45% by weight. This gave an opaque dispersion with a bluish shimmer which had a solids content of 44.0% by weight in terms of polyesterpolyol (measured as the non-volatile fraction of a dispersion sample which was dried in a forced-air oven at 125° C. for 60 minutes), an acid number of 16.7 mg KOH/g (based on as-supplied form), an OH number of 130 mg KOH/g (based on resin solids) and a viscosity of 210 mPa·s at 23° C. The dispersion contains about 2.4% by weight of N-methylpyrrolidone, about 1.8% by weight of N,N-dimethylethanolamine and about 50.8% by weight of water. The product can be diluted further with water and is suitable for use in aqueous two-component polyurethane coating materials.

Application Examples

In the following application examples conventional methods of coatings technology were used to prepare pigmented two-component polyurethane paints for different fields of use and these paints were applied to metal test panels under standard conditions and cured. In addition to the specific paint properties for the individual applications, such as solvent and chemical resistance, film hardness and flexibility, for example, the principal parameters assessed were the drying rate of the paints, the levelling and gloss of the films, and the water resistance.

| Products employed: | |
|---|---|
| Surfynol ® 104 E: | Defoaming wetting agent, air products, sold by W. Biesterfeld & Co., Hamburg, DE |
| Tronox ® R-KB-4: | Titanium dioxide pigment, Kerr McGee Pigments GmbH & Co. KG, DE |
| Acrysol ® RM 8: | 20% strength in ethanol, thickener, Rohm & Haas Deutschland GmbH, Frankfurt/Main, DE |
| Byk ® 346 | Levelling additive/substrate wetting, Byk Chemie, Wesel, DE |
| Byk ® 380 | Levelling additive/anticrater agent, Byk Chemie, Wesel, DE |
| Bayhydur ® VP LS 2319 | Hydrophilicized aliphatic polyisocyanate, Bayer AG Leverkusen, DE |
| Surfynol ® 104 BC: | Defoaming wetting agent, air products, sold by W. Biesterfeld & Co., Hamburg, DE |
| Baysilone ® VP AI 3468 | 10% strength in butylglycol, slip additive, Borchers GmbH, Monheim, DE |
| Borchigen ® SN 95 | Wetting agent and dispersant, Borchers GmbH, Monheim, DE |
| Borchigel ® PW 25 | Thickener, Borchers GmbH, Monheim, DE |

Example 11

White two-component topcoat material for general industrial coating, based on the polyesterpolyol of example 1.

Component 1

In a commercially customary dissolver (15 minutes at a peripheral speed of 10 m/s) a millbase was prepared to the following formulation:

| | |
|---|---|
| 33.00 | parts by weight polyesterpolyol I |
| 0.81 | part by weight Surfynol ® 104 E |
| 30.12 | parts by weight titanium dioxide Tronox ® R-KB-4 |
| 3.13 | parts by weight deionized water |

The millbase was dispersed in a Skandex shaker with Siliquartz beads of 2 mm in diameter for about 60 minutes. The millbase was then separated from the glass beads by sieving and, with stirring, the following paint components were added (make-up):

| | |
|---|---|
| 12.20 | parts by weight polyesterpolyol I (from example 1) |
| 0.55 | part by weight Acrysol ® RM 8, 20% strength in ethanol, |
| 0.21 | part by weight Byk ® 346 |
| 0.32 | part by weight Byk ® 380 |

Thereafter component 1 (formulated polyol component) was ready for further use. To produce a two-component paint component 1 was mixed with the polyisocyanate curing agent (component 2). Component 2 contains from the following ingredients:

Component 2

| | |
|---|---|
| 15.73 | parts by weight Bayhydur ® VP LS 2319 |
| 3.93 | parts by weight methoxypropyl acetate |
| 100.00 | parts by weight |

Components 1 and 2 were mixed at a stirrer speed of 2000 rpm for 2 minutes. The finished two-component paint was then adjusted to a spray viscosity of about 30 s (efflux time from DIN 4 mm cup at 23° C.) by adding water. The white paint thus formulated was applied using a commercially customary spray gun (Sata Jet B, nozzle 1.4 mm, pressure 3.5 to 4 bar) to metal test panels [steel: 20×10 cm, aluminium: 15×7 cm, zinc: 16.5×6.5 cm and Unibond WH/60/OC (iron-phosphated steel): 20×10 cm] and subjected to paint testing after 1 day, 7 days and 14 days of drying at room temperature (23° C., 50% relative atmospheric humidity).

Using a doctor blade (120 µm slot width) the paint was applied to glass plates and, with drying at room temperature, the initial drying, evaporation time and gloss were measured. The potlife (doubling in spray viscosity) was determined by measuring the efflux time (DIN 4 mm cup at 23° C.). The initial drying was determined in accordance with DIN 53 150. The following technical paint properties were tested on the cured coatings:

| | |
|---|---|
| Glass plates/steel: | Determination of gloss (20°/60°) in accordance with DIN 67 530 |
| Glass plates: | Determination of evaporation time in accordance with DIN 53 157 |
| Steel/aluminium/zinc panel: | Testing of adhesion in accordance with EN ISO 2409 |
| Steel panel: | Testing of Erichsen cupping in accordance with DIN ISO 1520 |
| Steel panel: | Testing of chemical resistance (acetone/xylene, 1 min/5 min exposure) |
| Unibond WH/60/OC: | Testing of water resistance after 16 hours of drying at room temperature. |
| Gloss: | in accordance with DIN 67 530 |
| Blistering: | in accordance with DIN 53 209 |
| Adhesion: | in accordance with EN ISO 2409 |

Example 12

White two-component topcoat material for large-vehicle finishing, based on the polyesterpolyol I.

Component 1

In a commercially customary dissolver (15 minutes at a peripheral speed of 10 m/s) a millbase was prepared to the following formulation:

| | |
|---|---|
| 38.91 | parts by weight polyesterpolyol I |
| 1.09 | parts by weight Surfynol ® 104 BC |
| 0.91 | part by weight Baysilone ® VP AI 3468, 10% strength in butylglycol |
| 6.98 | parts by weight Borchigen ® SN 95 |
| 0.13 | part by weight Borchigel ® PW 25⁾ |
| 29.02 | parts by weight titanium dioxide Tronox ® R-KB-4 |

The millbase was dispersed in a Skandex shaker with Siliquartz beads of 2 mm in diameter for about 60 minutes. The millbase was then separated from the glass beads by sieving. Thereafter component 1 (formulated polyol component) was ready for further use. To produce a two-component paint component 1 was mixed with the polyisocyanate curing agent (component 2). Component 2 contained from the following ingredients:

Component 2

| | |
|---|---|
| 15.53 | parts by weight Bayhydur ® VP LS 2319 |
| 3.88 | parts by weight methoxybutyl acetate |
| 100.00 | parts by weight |

Components 1 and 2 were mixed at a stirrer speed of 2000 rpm for 2 minutes. The finished two-component paint was then adjusted to a spray viscosity of about 25 s (efflux time from DIN 4 mm cup at 23° C.) with deionized water. The white paint thus formulated was applied in analogy to example 11 using a commercially customary spray gun of the type Sata Jet HVLP NR 2000 (1.3 mm nozzle, pressure 3.5 to 4 bar) from Sata Farbspritztechnik GmbH, Komwestheim, Del. to coated, circularly perforated metal panels, dimensions: 150×300 mm, available commercially under article No. 17542H11ME from Heinz Zanders, Liebigstraβe 22, 42719 Solingen, Del. Curing was carried out at 60° C. for 30 minutes and then at room temperature.

Examples 13 to 16

As in example 11, white two-component topcoat materials for general industrial coating were prepared on the basis of polyesterpolyols II (example 2), III (example 3), IV (example 4) and V (example 5) and applied.

Examples 17 and 18

As in example 12, white two-component topcoat materials for large-vehicle finishing are prepared on the basis of polyesterpolyols VI (example 6) and VII (example 7) and applied.

Comparative Example 19

As in example 11, white two-component topcoat materials for general industrial coating are prepared on the basis of polyesterpolyol IX and applied.

Comparative Example 20

As in example 12, white two-component topcoat materials for large-vehicle finishing are prepared on the basis of polyesterpolyol X and applied.

Test Results of Aqueous Two-component Polyurethane Paints Based on the Polyesterpolyols I to V and IX (General Industrial Coating):

TABLE 1

Results of the technical paint tests

| | | \multicolumn{6}{c}{Paint from Example No.} | | | | | |
|---|---|---|---|---|---|---|---|
| | | 11 | 13 | 14 | 15 | 16 | 19 |
| Potlife, h | | 6 | 5 | 5 | 5 | 5 | 6 |
| Drying, T1/T3 in h | | 1/5 | 0.5/5 | 0.5/5 | 1/5.5 | 1/5.5 | 1.5/5.5 |
| Pendulum damping, s after | 1 d | 113 | 95 | 101 | 85 | 82 | 110 |
| | 7 d | 129 | 102 | 110 | 99 | 93 | 115 |
| | 14 d | 130 | 104 | 113 | 103 | 97 | 118 |
| Erichsen extension, mm after | 14 d | 10.0 | 8.6 | 8.0 | 9.3 | 9.4 | 7.4 |
| Gloss 20°/60° | | 88/96 | 88/96 | 88/96 | 87/97 | 86/94 | 89/96 |
| Resistance[1] to xylene/acetone | 1 d | 2/2 | 1/2 | 1/2 | 1/2 | 1/2 | 2/2 |
| 5 min exposure time | 7 d | 1/2 | 0/2 | 0/2 | 1/2 | 0/2 | 1/2 |
| | 14 d | 1/2 | 0/2 | 0/2 | 0/2 | 0/2 | 1/2 |
| Resistance[2] to water after | 1 d | 74/95 | 76/93 | 79/94 | 72/95 | 69/91 | 70/93 |
| | 7 d | 73/92 | 73/89 | 75/90 | 68/87 | 65/84 | 11/28 |
| | 14 d | 53/83 | 51/76 | 53/79 | 49/72 | 48/70 | — |
| Adhesion[1] to steel after | 1 d | 2 | 1 | 1 | 1 | 0 | 2 |
| | 7 d | 2 | 1 | 1 | 0 | 0 | 2 |
| | 14 d | 2 | 1 | 1 | 1 | 1 | 1 |
| Adhesion[1] to zinc after | 1 d | 2 | 1 | 1 | 1 | 1 | 1 |
| | 7 d | 2 | 1 | 1 | 1 | 0 | 2 |
| | 14 d | 2 | 1 | 1 | 1 | 1 | 1 |
| Adhesion[1] to Al after | 1 d | 2 | 1 | 1 | 1 | 1 | 2 |
| | 7 d | 2 | 1 | 1 | 1 | 1 | 2 |
| | 14 d | 2 | 1 | 1 | 1 | 1 | 2 |
| Adhesion[1] to Unibond | 1 d | 2 | 1 | 1 | 1 | 1 | 2 |
| | 7 d | 2 | 2 | 2 | 2 | 2 | 5 |
| | 14 d | 2 | 3 | 2 | 3 | 3 | — |

[1] 0 = best score (nothing found), 5 = worst score (film completely dissolved and/or no longer adhering)
[2] Water storage test: Determination of gloss after days; the higher the score the better Test Results of Aqueous Two-component Polyurethane Paints Based on the Polyesterpolyols I, VI, VII and X (Large-vehicle Finishing):

TABLE 2

Results of the technical paint tests

| | | \multicolumn{4}{c}{Paint from Example No.} | | | |
|---|---|---|---|---|---|
| | | 12 | 17 | 18 | 20 |
| Potlife, h | | 6 | 6 | 6 | 6 |
| Drying, T1/T3 in h | | 2/6 | 2.5/6 | 2/6 | 3/8 |
| Pendulum damping, s after | 1 d | 126 | 64 | 120 | 73 |
| | 4 d | 176 | 116 | 154 | 94 |
| | 7 d | 175 | 116 | 161 | 98 |
| Erichsen extension, mm after | 14 d | 10.0 | 10.0 | 10.0 | 10.0 |
| Gloss 20° | | 96 | 90 | 88 | 87 |
| Haze | | 20 | 22 | 25 | 35 |
| Resistance[1] to xylene | 1 d | 1 | 2 | 2 | 2 |
| 5 min after | 4 d | 1 | 1 | 1 | 2 |
| | 7 d | 1 | 1 | 1 | 1 |
| Resistance[1] to MPA | 1 d | 1 | 2 | 2 | 2 |
| 5 min exposure time after | 4 d | 1 | 2 | 1 | 2 |
| | 7 d | 1 | 1 | 1 | 1 |
| Resistance[1] to premium-grade petrol | 1 d | 1 | 1 | 2 | 2 |
| 5 min exposure time after | 4 d | 1 | 1 | 1 | 2 |
| | 7 d | 1 | 1 | 1 | 1 |
| Resistance[1] to water | 1 d | 1 | 2 | 2 | 3 |
| 1 h exposure time after | 4 d | 1 | 1 | 1 | 3 |
| | 7 d | 1 | 1 | 1 | 2 |

[1] 0 = best score (nothing found), 5 = worst score (film completely dissolved and/or no longer adhering)
[2] Water storage test: Determination of gloss after days; the higher the score the better Discussion of the Test Results:

With the polyesterpolyols of examples 1 to 7, 9 and 10 it is possible in combination with water-dilutable aliphatic polyisocyanates to prepare aqueous two-component polyurethane paints which possess a sufficiently long processing time, dry rapidly on application to a substrate, and give glossy to highly glossy paint films. The paints based on the polyesters I to VII of the invention all have more rapid drying, greater hardness and better solvent resistance than the paints based on the comparative polyesters IX and X. Of critical significance, however, is the substantially better water resistance of the paint films based on the polyesters of the invention in comparison to the paints based on the comparative polyesters.

What is claimed is:

1. Aqueous solutions or dispersions of polyesterpolyols wherein the polyester polyols contain free hydroxyl and carboxyl groups, have acid numbers of from 20 to 60 mg KOH/g and hydroxyl numbers of 10 to 400 mg KOH/g and comprise one or more structural units of the general formula (I)

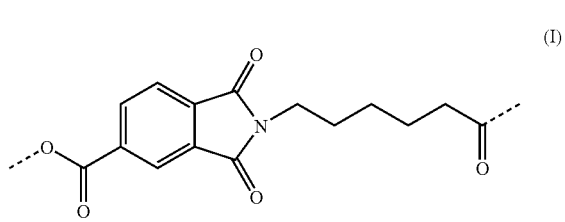

and/or one or more structural units of the general formula (II)

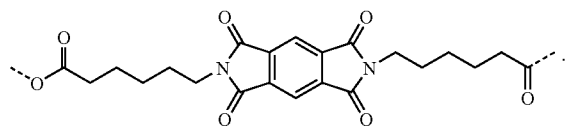

(II)

2. Aqueous solutions or dispersions of polyesterpolyols wherein the polyesterpolyols contain free hydroxyl and carboxyl groups, have acid numbers of from 20 to 60 mg KOH/g and hydroxyl numbers of 10 to 400 mg KOH/g and comprise, as end groups, one or more structural units of the general formula (III)

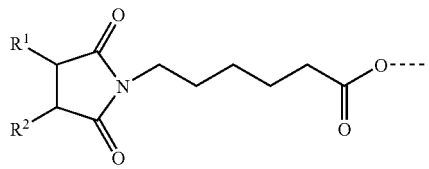

(III)

and/or one or more structural units of the general formula (IV)

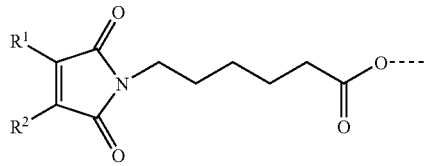

(IV)

in which $R^1$ and $R^2$ are identical or different and represent hydrogen, halogen, $C_1$–$C_{18}$ alkyl, $C_2$–$C_{18}$ alkenyl, $C_2$–$C_{18}$ alkynyl, $C_3$–$C_{12}$ cycloalkyl, $C_3$–$C_{12}$ heterocycloalkyl, $C_6$–$C_{24}$ aryl, $C_1$–$C_{18}$ alkoxy, $C_1$–$C_{18}$ alkylthio, $C_1$–$C_{18}$ alkylamino radicals or with the joining carbon atom of the $C_4N$ five-membered ring form a $C_3$–$C_{12}$ cycloalkyl or $C_2$–$C_{13}$ heterocycloalkyl radical optionally containing oxygen, nitrogen and/or sulphur or both together with the joining carbon atoms of the $C_4N$ five-membered ring form a fused cyclic or polycyclic ring system which is saturated, unsaturated, partly or fully aromatic, and optionally contains oxygen, nitrogen and/or sulphur.

3. The aqueous solutions or dispersions of polyesterpolyols according to claim 1 or 2, characterized in that the polyesterpolyols have hydroxyl numbers of from 15 to 350 mg KOH/g.

4. The aqueous solutions or dispersions of polyesterpolyols according to claim 1 or 2, characterized in that the polyesterpolyols have hydroxyl numbers of from 20 to 300 mg KOH/g.

5. Aqueous coating compositions comprising the aqueous polyesterpolyols according to claim 1 or 2.

6. The aqueous coating compositions according to claim 5, characterized in that they also contain solvent.

7. The aqueous coating compositions according to claim 5 which additionally contain one or more optionally blocked polyisocyanates, optionally further binders and optionally auxiliaries and additives.

* * * * *